Dec. 9, 1952    R. W. SMITH ET AL    2,620,763
SIGNAL FLARE EXTENSION DEVICE
Filed Dec. 5, 1949

INVENTORS
ROBERT W. SMITH
IRWIN A. SPADY
BY WHITEHEAD & VOGL

PER *Earle Whitehead*
ATTORNEYS

Patented Dec. 9, 1952

2,620,763

UNITED STATES PATENT OFFICE 2,620,763

SIGNAL FLARE EXTENSION DEVICE

Robert W. Smith, Denver, and Irwin A. Spady, Littleton, Colo.

Application December 5, 1949, Serial No. 131,195

7 Claims. (Cl. 116—39)

This invention relates to signal apparatus, and more particularly to signal flares which are used in conjunction with trucks, busses and the like, as warning devices when such vehicles are obliged to stop on or beside the highway.

An object of this invention is to provide in a vehicle, such as a motor bus, a signal flare-extending apparatus which may be installed as standard equipment.

Another object of this invention is to provide in a motor vehicle a signal flare-extending apparatus which is instantaneously operable to provide a warning signal immediately upon the stoppage of the vehicle.

Another object of this invention is to provide a signal flare-extending apparatus for motor vehicles, which uses a conventional type of flare, easily installed without any modification of the flare in order to accomplish the installation.

Another object of this invention is to provide in a signal flare-extending apparatus means for simultaneously lighting and extending a conventional type of flare.

Another object of this invention is to provide a signal flare-extending apparatus which may be used in motor vehicles and which is operative by remote control, whereby the apparatus may be installed at the rear end of the vehicle and operated from the driver's compartment.

Another object of this invention is to provide a signal flare-extending apparatus operative by means independent of other mechanisms and circuits related to the motor vehicle, whereby the signal flare-extending apparatus will be operative regardless of the nature of a motor or mechanism failure of the vehicle.

Another object of this invention is to provide in such apparatus means for quickly and easily replacing conventional type flares.

Yet another object of this invention is to provide a signal flare-extending apparatus adapted for installation as standard equipment in a motor vehicle, which is simple in construction, economical in cost, adaptable for installation in various types of vehicles, and rugged, sturdy and durable over a long period of actual use.

With these and other objects in view, all of which more fully hereinafter appear, our invention comprises certain novel constructions, combinations and arrangements of parts as hereinafter described and defined in the appended claims and illustrated in preferred embodiment in the accompanying drawing in which:

In the operation of motor vehicles, particularly passenger busses, a stoppage necessitated as by breakdown along the highway at night may be hazardous, and if the vehicle stops on or alongside the highway, signal flares must be posted warning oncoming traffic of the situation.

Often trouble arises with the wiring circuits of the vehicle at the time of the stoppage, whereby the operator is completely without lights of any kind and there is always, in such a situation, a serious danger during that interval between stopping and the posting of the signal flares. Should the stoppage be accompanied by a condition which requires the immediate attention of the operator, such as a fire in the motor, there will be a substantial interval during which there is no warning signal, with resulting danger from oncoming vehicles. The present invention was conceived and developed to avoid this contingency and comprises in essence a device for automatically lighting and extending a flare, responsive to an impulse by the operator.

Figure 1:
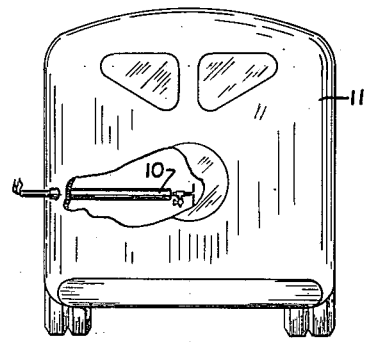
Figure 1 is a rear elevation of a conventional passenger bus with portions broken away to show a typical installation of the invention therein.
Figure 2:
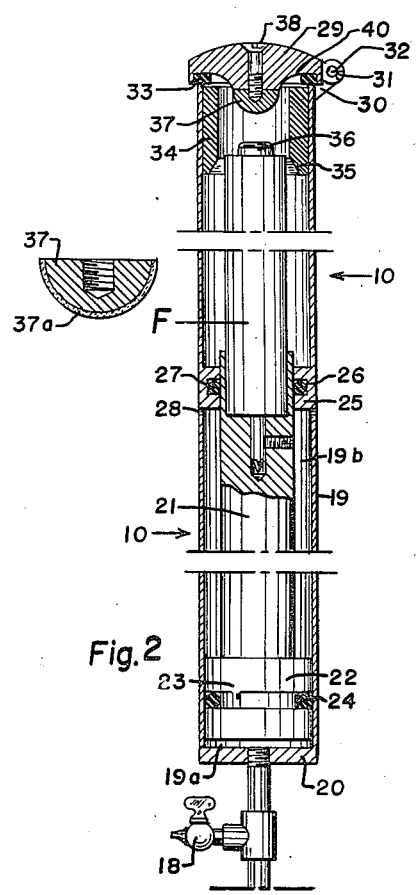
Figure 2 is a longitudinal section of the signal flare-extending apparatus in retracted position and having a flare inserted therein as for ultimate use.

In the present invention the apparatus comprises a cylindrical container 10 suitably mounted in a vehicle 11, the container being shown as mounted horizontally, but may be mounted in any other position desired. An air line 12 is attached to the bottom of this container and may extend to the operator's compartment of the vehicle. In this compartment the line is connected with a valve 13 instantaneously operable, responsive to a pull on any convenient handle device such as a line 14. Beyond this valve the line may be connected to a suitable reservoir 15 which holds a charge of compressed air sufficient to actuate the flare-extending apparatus within the container, as hereinafter described. It is desirable to provide a reservoir 15, independent of other pressure tanks in the vehicle, to eliminate the possibility of pressure loss due to a vehicle breakdown. Accordingly a suitable supply line 16 is connected to the reservoir 15 and attached to an air compressor source, not shown, and in this supply line, a check valve 17 is preferably installed in the line 16 to prevent loss of pressure in the reservoir, regardless of a loss of pressure at the source of supply. In the air line 12 there may be installed a suitable valve 18 to release the air pressure from the container 10, whenever such is desired, as for instance in the recharging operation hereinafter described. Container 10 is formed as a cylindrical tube 19, enclosed at the lower end by a cap 20 which may be integral therewith. In this cap the air line 12 is attached as illustrated at Fig. 2. Concentrically within the tube 19 there is provided a plunger 21 having a flare F attached thereto. The combined length of the plunger and flare is such that the assembly will be lodged completely within the tube 19. At the bottom of the plunger there is provided a shoulder 22, slidably mating the inner wall of the tube 19 and having a circumferential groove 23 therein to contain a conventional O-ring gasket 24. Within the tube 19 there is provided an inwardly projected ring 25 integral to the tube and slidably circumscribing the plunger 21. A groove 26 is formed at the inner face of this ring to contain a conventional O-ring gasket 27. The purpose of the O-ring gasket 27 is to facilitate sliding of the plunger past the ring 25, and it does not necessarily function as a gasket.

Figure 4:
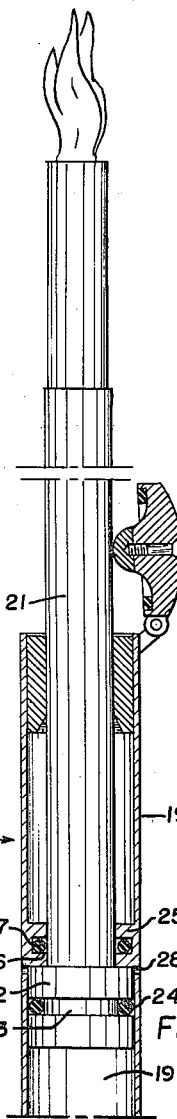
Figure 4 is similar to Fig. 2 but illustrates the apparatus in extended and operative position.
Figure 3:
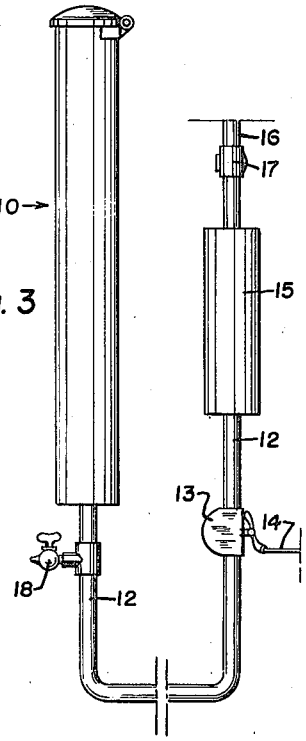
Figure 3 is an elevation of the apparatus illustrated at Fig. 2, on a reduced scale, and somewhat diagrammatic in nature, illustrating further actuating elements which may be remote from the apparatus as indicated by broken lines.
Figure 5:
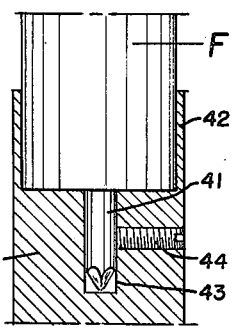
Figure 5 is a fragmentary detail of the apparatus shown at Fig. 2 but on an enlarged scale to better illustrate the elements therein.

Movement of the plunger from the lower position illustrated at Fig. 2 to the extended position illustrated at Fig. 4 is accomplished by a charge of compressed air from the line 12 entering the chamber 19a between the cap 20 and the shoulder 22. To evacuate the air within the chamber 19b between the shoulder 22 and the ring 25 as this chamber 19b diminishes by movement of the plunger, a vent 28 is provided in the side of the tube 19. The extended position of the plunger is limited by the shoulder 22 contacting the ring 25. The comparative length of the plunger and container may be such that the plunger may extend any desired length beyond the container when in an extended position.

The upper portion of the container which carries the flare F in the retracted position, and above the ring 25, is suitably closed at its opening by a lid 29 hingedly attached to the tube 19 through lugs 30 and pin 31. A suitable spring 32 may be provided around the hinge pin 31 to resiliently hold the lid in the closed position. To provide a water and weather resistant closure and protect the flare therein, a gasket 33 may be lodged in the lid 29 and held within a suitable recess in the lid. A cylindrical filler ring 34 is provided at the top of the tube 19, having an inner diameter such that the plunger 21 may slidably move past this ring to the extended position. To facilitate the guiding of the plunger into this ring, an inward chamfer 35 is provided.

A conventional flare of the type anticipated for use in this invention is provided with a fuse head 36 which may be ignited by striking pyrophoric material, and the length of the tube 19 is such that the flare when in the fully retracted position is a suitable distance from the lid 29 to attain an initial velocity before striking the lid 29 when it is extended. On the under side of the lid 29 there is attached a button 37 by a screw 38 in line with the head against which the head will strike in its outward movement. A covering of pyrophoric material 37a is placed upon this button 37. To insure movement of the flare and plunger from the container and to further insure movement of the plunger from the container when there is no flare therein, a fillet 40 circumferential of the button is formed on the inner surface of the lid.

The conventional flare is provided with an extended spike 14 at its bottom to provide a convenient attaching means for various purposes. In the present invention the flare is slidably inserted in an opening 42 at the top of the plunger, which holds the flare concentrically therein with the flare and plunger having a common longitudinal axis. An axial hole 43 is provided below the opening 42 to accommodate this spike 41, and a set screw 44 radial thereto is directed into the hole 43 and against the spike 41 to securely hold the flare in place.

The operation of the device will be described as commencing when the plunger is extended as illustrated at Fig. 4 but after the ignited flare, there illustrated, has burned out. Screw 44 will be retracted sufficiently to release spike 41 and this will result in the head of the screw projecting beyond the surface of the plunger sufficiently to prevent the sliding of the plunger back into the container until a fresh flare has been seated in the plunger and the screw set against its spike so that the screw head is within the surface of the plunger. Thus the screw 44 normally prevents the retraction of the plunger within the container except when provided with a flare.

When the fresh flare has been seated in the plunger and the screw set the air pressure within the chamber 19a is relieved by opening the valve 18 whereupon the plunger and flare may be shoved into the container to the retracted position shown at Fig. 2 whereupon the container is closed. Valve 18 is then closed and as valve 13 is normally closed until opened by the operator the atmospheric condition in chamber 19a prevents forward movement of the plunger and flare thereby preventing accidental ignition of the flare.

Normal operation of the vehicle charges reservoir 15 with compressed air from the source in the vehicle, as hereinbefore explained. Whenever the operator desires to set off a flare, he simply opens valve 13 allowing the charge of compressed air to pass from the reservoir to chamber 19a and force the plunger and flare to extended position. The head 36 of the moving flare strikes the pyrophoric material 37a on the button 37 to cause an ignition of the flare, and upon attaining the extended position the flare is burning without further attention.

While we have herein described a specific embodiment of our invention, other arrangements, alternatives and equivalents, all within the scope and spirit of this invention will occur to those skilled in the art, and we are not to be limited in our protection except by the appended claims.

We claim:

1. A signal-flare projecting apparatus carried by a structure having a wall, said apparatus including, in combination, an elongated container having an end adjacent said wall, a plunger slidably mounted within the container, a flare within the container engaged to an end of the plunger within the container, means for slidably extending the flare and flare-engaged end of said plunger from and beyond said end of said container, whereby to project said flare beyond said wall, and means to ignite the flare responsive to the extension of the flare from the container.

2. The organization according to claim 1, wherein the container includes a cylindrical tube, a hinged closure for one end of the tube, the plunger being a cylindrical body concentrically and slidably mounted therein and adapted to extend from and beyond said end of the tube with a flare carried at the leading end of the plunger, and adapted to strike and open the hinged closure during such extension movement.

3. The apparatus as defined in claim 1, said flare being a conventional spiked flare having a base and a spike depending from the base, said means for engaging the flare to the plunger comprising a cylindrical recess in the plunger adapted to receive the flare base and a recess below said first recess adapted to receive the spike.

4. In a device as defined in claim 1, a set screw in the plunger adapted, when set, to engage the flare to the plunger and positioned beyond the container when the plunger is extended and adapted to extend laterally beyond the wall of the container when retracted to release the flare, whereby to prevent retraction of the plunger into the container when said screw is in other than set, flare-engaging position.

5. A signal-flare-extending apparatus, adapted for use with a cylindrical flare having an igniting head at one end and a support spike at the other end, comprising; a tubular container, a plunger slidably mounted therein for movement along the longitudinal tubular axis, means for engaging the spike end of a flare to one end of the plunger in parallelism with the longitudinal tubular axis, means for sliding the plunger and thereby extending the plunger from and beyond one end of the container with the flare at the extended plunger end, and means carried by the container adapted to engage and ignite the ignition head of the flare during its movement to extended position.

6. A signal-flare-extending apparatus, adapted for use with a cylindrical flare having a precussive-frictional responsive igniting head at one end and a support spike at the other end, comprising, in combination, a tubular container, a plunger slidably mounted therein for movement along the longitudinal tubular axis, means for engaging the spike to one end of the plunger in parallelism with the longitudinal tubular axis, means for sliding the plunger and thereby extending the flare-engaged end of the plunger from and beyond one end of the container, a resiliently hinged cover normally closing said end of the container and adapted to be opened and ignite said head responsive to impact of the flare-igniting head during its extending movement.

7. In the apparatus as defined in claim 6, a coating of pyrophoric material on said hinged cover to facilitate ignition of the flare igniting head.

ROBERT W. SMITH.
IRWIN A. SPADY.

REFERENCES CITED

The following references are of record in the file of this patent:

UNITED STATES PATENTS

| Number | Name | Date |
|---|---|---|
| 282,570 | Rushforth | Aug. 7, 1883 |
| 1,132,631 | Still | Mar. 23, 1915 |
| 2,099,331 | Grenshaw | Nov. 16, 1937 |
| 2,462,922 | Temple | Mar. 1, 1949 |

FOREIGN PATENTS

| Number | Country | Date |
|---|---|---|
| 280,738 | Italy | Dec. 18, 1930 |
| 407,993 | Great Britain | Mar. 26, 1934 |